Jan. 1, 1929.
W. E. SLOAN
1,697,481
FLUSH VALVE
Filed April 28, 1924
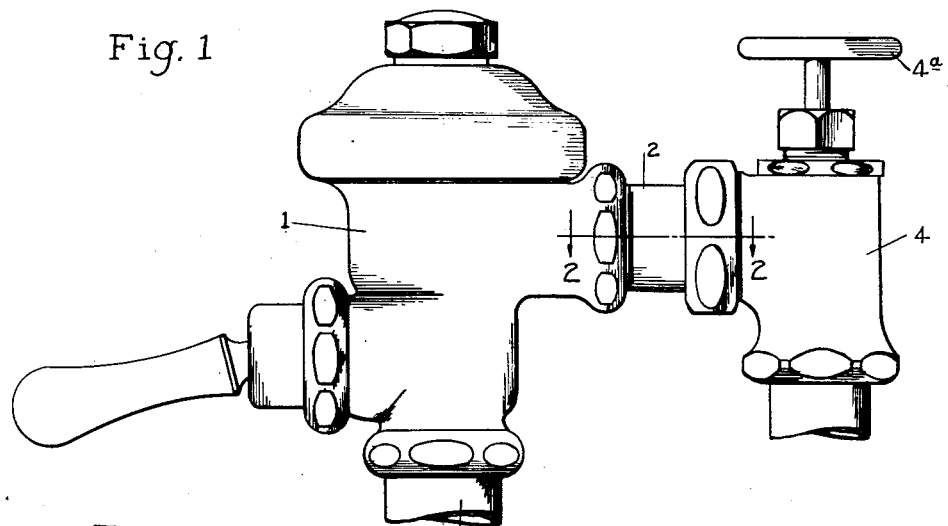
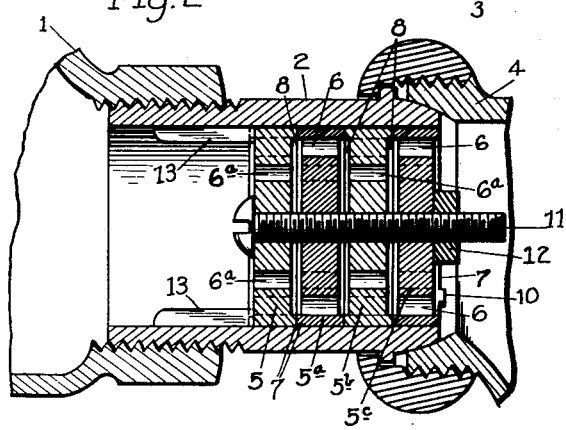
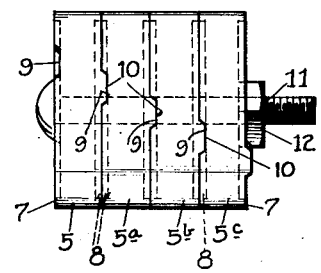
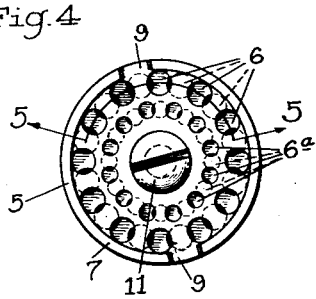
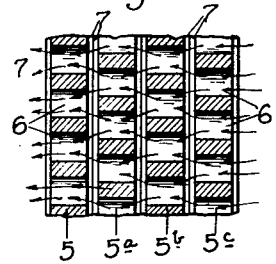
INVENTOR:
William E. Sloan
BY Parker & Barton ATTYS.

Patented Jan. 1, 1929.

1,697,481

UNITED STATES PATENT OFFICE.

WILLIAM E. SLOAN, OF CHICAGO, ILLINOIS.

FLUSH VALVE.

Application filed April 28, 1924. Serial No. 709,364.

This invention relates to a silencer adapted to be placed in liquid conduits, for the purpose of preventing noise incident to the flow or movement of liquid therein, when such flow is suddenly checked or accellerated, such noise being especially noticeable when the pressure of liquid in the conduit is high. The invention is particularly adapted for use in connection with a conduit leading to a flush valve and in the accompanying drawings is illustrated in such connection.

Referring now to the drawings:

Fig. 1 is a view of the valve and associated parts.

Fig. 2 is an enlarged sectional view taken on line 2—2 of Fig. 1.

Fig. 3 is a view of the noise reducing device separate from the other parts.

Fig. 4 is an end view of the device illustrated in Fig. 3.

Fig. 5 is a sectional view with parts omitted taken on line 5—5 of Fig. 4.

Referring now to the drawings, I have shown a flush valve 1 having an inlet pipe 2 and a discharge pipe 3. Connected with the pipe 2 leading to the source of water supply is a throttle valve 4 of any desired form. I have illustrated a throttle valve having a control handle 4ª by means of which the valve controlling the passageway is moved to control such passageway. When flush valves are used it is often necessary to throttle the connection from the valve leading to the source of water supply particularly if the pressure is high, and this makes a very objectionable noise. In the present construction I provide means for preventing this noise. In the construction shown there is inserted in the pipe 2 a series of discs 5, 5ª, 5ᵇ, 5ᶜ. These discs are each provided with openings 6, 6ª. Each disc is preferably provided with a raised outer edge 7 so that when the discs are brought together there is a space 8 between them. The outer edge on one side is provided with the notches 9 and the outer edge on the other side is provided with the projections 10. When the discs are brought together the projections 10 fit into the notches 9 so as to hold the discs against relative movement. These projections and notches are so arranged that the holes in the discs are staggered. The discs are provided with central openings through which the fastening devices 11 pass, said fastening devices being shown as a screw with a nut 12 by means of which the discs are clamped together. These discs may be made of any suitable material but preferably of lead, and they may be all molded in the same mold, that is to say all that are molded in the same mold will fit together in the proper relation as shown in Fig. 3. The discs are then inserted in the connection leading to the flush valves as for example in the pipe 2, there being stops 13 to hold the discs against movement toward the valve due to the pressure of the water. The number of the discs will depend upon the pressure of the water in the system in which the valves are used. The higher the pressure the more discs required to prevent the noise. I have found that with this construction the objectionable noise due to the flow of water to the valve is prevented. This device, therefore, provides a convenient, cheap and adjustable means for accomplishing this purpose.

I claim:

1. A silencer for use in liquid conduits for reducing the noise produced by the movement of liquid therein, comprising a plurality of solid disks, of a size to fit within the conduit and clamped together with their edges in contact, the disks each having a plurality of openings through them and being connected together so that the openings are staggered, openings in the adjacent discs overlapping each other.

2. In a silencer adapted to be inserted into a liquid-conducting pipe, comprising a series of solid discs made of lead located in said pipe, each disc provided with a series of openings, a fastening device extending through said discs, the discs when in position having the holes of the several discs in staggered relation, each disc having a raised outer edge of less thickness than the disc so as to be cup shaped, the raised outer edges preventing the body portion of the discs from coming together and providing water spaces between them.

3. A silencer adapted to be inserted in a liquid-conducting pipe comprising a series of removable discs in said pipe, each disc having a raised outer edge, a notch in one raised edge of each disc, and a projection on the other raised edge of each disc, said projections and notches arranged so that when adjacent discs are brought together the openings therethrough are staggered.

4. A noise reducing unit for flowing water comprising a series of discs, each having a series of openings therethrough, a fastening device extending through the central portion of the discs and clamping them together with their edges in contact to form a self contained unit, and means for holding said discs against relative movement so that the openings therethrough will be in staggered relation but overlapping so as to have direct communication.

5. A silencer for use in liquid conduits for reducing the noise produced by the movement of the liquid therein comprising a plurality of solid discs with their edges in contact, each disc having a central opening and being provided with a series of outer openings arranged circumferentially near the periphery thereof and a second series of openings arranged circumferentially between said outer openings and the central opening, the circumferentially arranged openings of adjacent discs being staggered, a fastening device extending through the central opening of said discs and clamping them together to form a self contained unit.

Signed at Chicago, county of Cook and State of Illinois, this 12th day of April, 1924.

WILLIAM E. SLOAN.